United States Patent
Tang

(10) Patent No.: US 10,885,298 B2
(45) Date of Patent: Jan. 5, 2021

(54) METHOD AND DEVICE FOR OPTICAL FINGERPRINT RECOGNITION, AND COMPUTER-READABLE STORAGE MEDIUM

(71) Applicant: BEIJING XIAOMI MOBILE SOFTWARE CO., LTD., Beijing (CN)

(72) Inventor: Ju Tang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 115 days.

(21) Appl. No.: 16/041,934

(22) Filed: Jul. 23, 2018

(65) Prior Publication Data

US 2019/0034685 A1    Jan. 31, 2019

(30) Foreign Application Priority Data

Jul. 27, 2017    (CN) .......................... 2017 1 0624346

(51) Int. Cl.
G06K 9/00    (2006.01)
G06K 9/32    (2006.01)
G06F 3/041    (2006.01)

(52) U.S. Cl.
CPC .......... *G06K 9/0004* (2013.01); *G06F 3/041* (2013.01); *G06K 9/00013* (2013.01); *G06K 9/00087* (2013.01); *G06K 9/3233* (2013.01)

(58) Field of Classification Search
CPC ............. G06K 9/0004; G06K 9/00013; G06K 9/00087; G06K 9/3233; G06K 9/00107; G06F 3/041; G06F 3/043; G06F 3/0412
See application file for complete search history.

(56) References Cited

U.S. PATENT DOCUMENTS

| | | | |
|---|---|---|---|
| 6,215,874 B1 | 4/2001 | Borza et al. | |
| 2016/0246396 A1* | 8/2016 | Dickinson | G06F 3/0412 |
| 2017/0154198 A1 | 6/2017 | Li | |
| 2018/0032788 A1* | 2/2018 | Krenzer | G06K 9/00006 |
| 2019/0087627 A1* | 3/2019 | Ling | G06K 9/00053 |

FOREIGN PATENT DOCUMENTS

| | | |
|---|---|---|
| CN | 103632128 A | 3/2014 |
| CN | 104820828 A | 8/2015 |
| CN | 104992157 A | 10/2015 |

(Continued)

OTHER PUBLICATIONS

First Office Action issued to Chinese Patent Application No. 201710624346.2, dated Mar. 29, 2019 with English translation, (13p).

(Continued)

*Primary Examiner* — Leon Viet Q Nguyen
(74) *Attorney, Agent, or Firm* — Arch & Lake LLP

(57) ABSTRACT

The present disclosure relates to a method for optical fingerprint recognition, a device for optical fingerprint recognition, and a computer-readable storage medium. The method may include: receiving optical signals obtained by sensors in a first area when detecting a finger to be recognized is placed in the first area; determining a plurality of fingerprint optical signals in a coverage area corresponding to the finger to be recognized in the optical signals; and recognizing the finger to be recognized according to the plurality of fingerprint optical signals in the coverage area.

20 Claims, 5 Drawing Sheets

(56) References Cited

FOREIGN PATENT DOCUMENTS

| | | | |
|---|---|---|---|
| CN | 104992158 A | 10/2015 |
| CN | 105160642 A | 12/2015 |
| CN | 105488464 A | 4/2016 |
| CN | 105975833 A | 9/2016 |
| CN | 106096360 A | 11/2016 |
| CN | 106203407 A | 12/2016 |
| CN | 106249457 A | 12/2016 |
| CN | 106373969 A | 2/2017 |
| CN | 106940598 A | 7/2017 |
| JP | 2005135114 A | 5/2005 |
| RU | 2224287 C1 | 2/2004 |
| RU | 2311678 C2 | 11/2007 |

OTHER PUBLICATIONS

Second Office Action issued to Chinese Patent Application No. 201710624346.2, dated Sep. 4, 2019 with English translation, (13p).
First Office Action issued to Russian Patent Application No. 2018144377, dated Aug. 23, 2019 with English translation, (14p).
International Search Report and Written Opinion issued in International Application No. PCT/CN2017/103975, 10 pages.
European Office Action issued in EP Patent Application No. 18184217.0, dated Dec. 18, 2018, 8 pages.

* cited by examiner

METHOD AND DEVICE FOR OPTICAL FINGERPRINT RECOGNITION, AND COMPUTER-READABLE STORAGE MEDIUM

CROSS-REFERENCE TO RELATED APPLICATIONS

This application is based on and claimed priority to Chinese patent application No. 201710624346.2, filed on Jul. 27, 2017, the entire contents of which are incorporated herein by reference.

TECHNICAL FIELD

The present disclosure relates to a field of a terminal, and more particularly to a method and a device for optical fingerprint recognition, and a computer-readable storage medium.

BACKGROUND

A fingerprint recognition technology is widely used in a terminal device. For example, fingerprint recognition can be supported by mobile phones, tablet PCs, and laptops. The fingerprint recognition technology mainly includes capacitive fingerprint recognition, optical fingerprint recognition and ultrasonic fingerprint recognition. Applying optical fingerprint recognition on the terminal device can greatly improve the aesthetics of the terminal device, because a fingerprint can be scanned through glass without additional openings as a recognition area.

SUMMARY

In the present disclosure, a method for optical fingerprint recognition, a device for optical fingerprint recognition, and a computer-readable storage medium are provided to address the deficiencies in the related art.

According to a first aspect of the present disclosure, there is provided a method for optical fingerprint recognition, including: receiving optical signals obtained by sensors in a first area when detecting a finger to be recognized is placed in the first area; determining a plurality of fingerprint optical signals in a coverage area corresponding to the finger to be recognized in the optical signals; and recognizing the finger to be recognized according to the plurality of fingerprint optical signals in the coverage area.

According to a second aspect of the present disclosure, there is provided a device for optical fingerprint recognition, including: a receiving unit configured to receive optical signals obtained by sensors in a first area when detecting a finger to be recognized is placed in the first area; a determining unit configured to determine a plurality of fingerprint optical signals in a coverage area corresponding to the finger to be recognized in the optical signals; and a recognizing unit configured to recognize the finger to be recognized according to the plurality of fingerprint optical signals in the coverage area.

According to a third aspect of the present disclosure, there is provided a device for optical fingerprint recognition, including: a processor; a memory for storing instructions executable by the processor, in which the processor is configured to perform the method according to any one of the above embodiments.

According to a fourth aspect of the present disclosure, there is provided a computer-readable storage medium having stored therein computer instructions that, when executed by a processor, is configured to perform steps of the method according to any one of the above embodiments.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that terms such as "first", "second" and "third" are used herein for purposes of description of various information, but these information should not be limited to the above terms. These terms are used only to distinguish the same type of information from each other. For example, a first information may also be referred to as a second information without departing from the scope of the present application, and similarly, a second information may also be referred to as a first information. As used herein, the term "if" may be construed to mean "when" or "upon" or "in response to determining", depending on the context.

Figure 1:
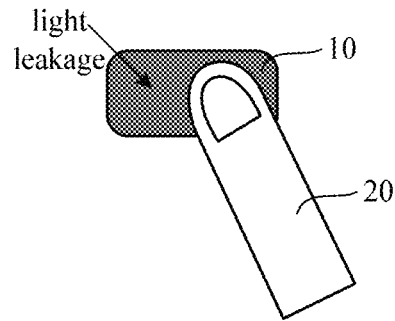
FIG. 1 is a schematic diagram showing optical fingerprint recognition in the related art.

FIG. 1 is a schematic diagram showing optical fingerprint recognition in the related art. An optical fingerprint sensor (below a recognition area 10, not shown) emits an optical signal outward. The optical signal is reflected on a surface of a finger 20 to be recognized, and the optical fingerprint sensor is configured to receive the reflected optical signal and convert it into an electrical signal, and then convert the electrical signal into a fingerprint image. The effective signal received by the optical fingerprint sensor is an optical signal reflected by the line of a fingerprint surface of the finger 20 to be recognized.

However, since the recognition area 10 is often not completely covered by the finger 20 to be recognized in the actual environment, light will be leaked in the recognition area 10 (such as a gray shade portion in FIG. 1) that is not covered by the finger 20 to be recognized, i.e., the optical fingerprint sensor will receive other optical signals (hereinafter referred to as "ambient optical signals") that are different from the optical signal reflected by the finger 20 to be recognized at the recognition area not covered by the finger 20 to be recognized. The ambient optical signals will cause interference to the subsequent fingerprint recognition.

Figure 2:
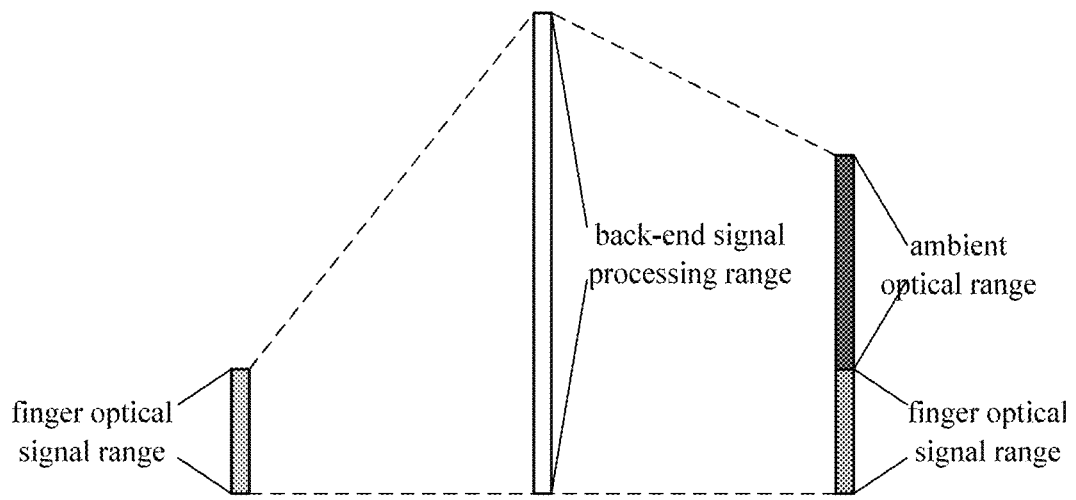
FIG. 2 is a schematic diagram showing a back-end signal processing.

Referring to FIG. 2, an electrical signal caused by the ambient optical signals in the optical fingerprint sensor is greatly different from an electric signal caused by the optical signal reflected by the fingerprint. However, because a range of the back-end signal processing is fixed, when a range of the front-end signal is small (e.g., only the fingerprint optical signal is contained, that is, only the optical signal emitted by the optical fingerprint sensor and reflected by the finger is present), the gain magnification times of converting to the back-end is large, the signal corresponding to the fingerprint optical signal portion in the back-end signal is large. When the ambient optical signals are received by the optical fingerprint sensor, the signal range of all the optical signals received by the optical fingerprint sensor increases, gain magnification times is reduced. Accordingly, the reduced gain magnification times causes that the signal corresponding to the fingerprint optical signal portion in the back-end signal is reduced as compared to the recognition area 10 completely covered by the finger, thereby affecting the signal-to-noise ratio of the effective signal, and reducing the efficiency and accuracy of the fingerprint recognition.

Accordingly, in the present disclosure, the above-described technical problems in the related art are solved by improving the way of fingerprint recognition, which will be described in detail with reference to the following examples.

Figure 3:
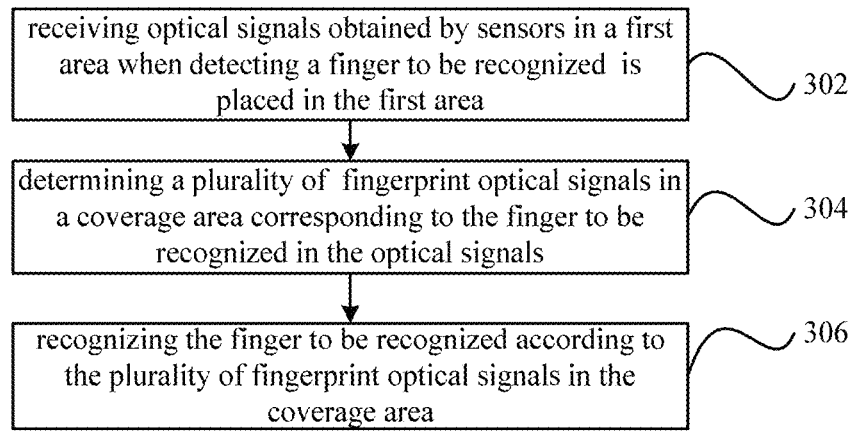
FIG. 3 is a flow chart showing a method for optical fingerprint recognition, according to an aspect of the disclosure.

FIG. 3 is a flow chart showing a method for optical fingerprint recognition, according to an aspect of the disclosure. Referring to FIG. 3, the method is applied to an electronic device and may include the following steps.

In step 302, optical signals obtained by detecting a finger to be recognized are received. The electronic device may receive optical signals obtained by sensors in a first area when detecting a finger to be recognized is placed in the first area. For example, the optical signals may include a plurality of optical signals received by a plurality of optical sensors in the recognition area. The recognition area may include both optical sensors and touch sensors. The touch sensors and optical sensors may work together so that the electronic device may select a portion of the optical signals and process the selected optical signals at the front-end.

In step 304, a fingerprint optical signal corresponding to the finger to be recognized in the optical signals is determined. The electronic device may select a plurality of optical signals in a coverage area inside the first area. The coverage area may be defined by a fingerprint contour.

In the present example, the fingerprint optical signal can be directly determined, or indirectly determined by first determining an ambient optical signal:

1. Directly Determining the Fingerprint Optical Signal

1) Through a Coverage Area of a Finger

It is possible to first sense a coverage area of the finger to be recognized and take an optical signal corresponding to the coverage area as the fingerprint optical signal. The coverage area of the finger to be recognized may be obtained by a touch region or a pressing region of the finger. The electronic device may identify the coverage area of the finger within a contour based on sensor output changes. For example, in one or more embodiments, the electronic device may detect the touch region of the finger to be recognized and take the touch region as the coverage area of the finger to be recognized. In some embodiments, the electronic device may detect a pressing operation of the finger to be recognized for a recognition area (it is possible to detect the pressing operation based on a preset pressure threshold, and determine that the finger has performed the pressing operation when a pressure value of the finger for a pressure sensor exceeds the preset pressure threshold), and determine a pressing region of the pressing operation, and take the pressing region as the coverage area of the finger to be recognized.

2) Through a Range of the Fingerprint Optical Signal

The electronic device may determine an optical signal in a range of a preset fingerprint optical signal in the optical signals, and take the determined optical signal as the fingerprint optical signal. The range of the preset fingerprint optical signal may be obtained by a person skilled in the art according to actual experimental data, and is not limited by the present disclosure. The electronic device may determine a contour of the fingerprint using the range of the preset fingerprint optical signal. Here, the preset fingerprint optical signal may change based on local time, ambient light, and other sensor inputs.

2. Indirectly Determining the Fingerprint Optical Signal

The electronic device may determine an ambient optical signal in the optical signals, and take other signals distinguished from the ambient optical signal in the optical signals as the fingerprint optical signal. It is possible to determine an optical signal in a range of a preset ambient optical signal in the optical signals, and take the determined optical signal as the ambient optical signal.

In one or more embodiments, it is possible to improve the signal-to-noise ratio of the acquired fingerprint information of the finger to be recognized by determining the fingerprint optical signal (i.e., the effective signal received by the optical fingerprint sensor), thereby improving the efficiency and accuracy of subsequent fingerprint recognition.

In step 306, the finger to be recognized is recognized according to the fingerprint optical signal.

As can be seen from the above-described examples of the present disclosure, the interference caused by the ambient optical signal distinguished from the fingerprint optical signal to the fingerprint recognition may be effectively eliminated by extracting the fingerprint optical signal corresponding to the finger to be recognized from the detected optical signals and further performing fingerprint recognition on the fingerprint optical signal, thus enhancing the efficiency of fingerprint recognition and improving the accuracy of fingerprint recognition.

Figure 4:
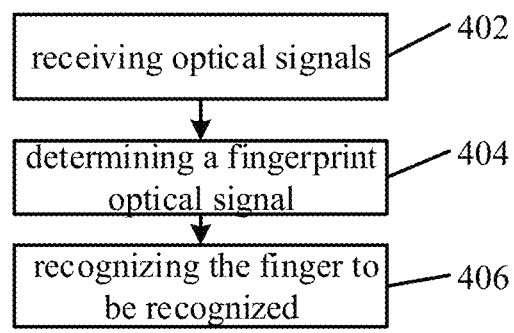
FIG. 4 is a flow chart showing another method for optical fingerprint recognition, according to an aspect of the disclosure.

For ease of understanding, the technical solution of the present disclosure will be further described below with reference to the drawings. FIG. 4 is a flow chart showing another method for optical fingerprint recognition, according to an aspect of the disclosure. Referring to FIG. 4, the method may be applied to an electronic device and may include the following steps.

Figure 5:
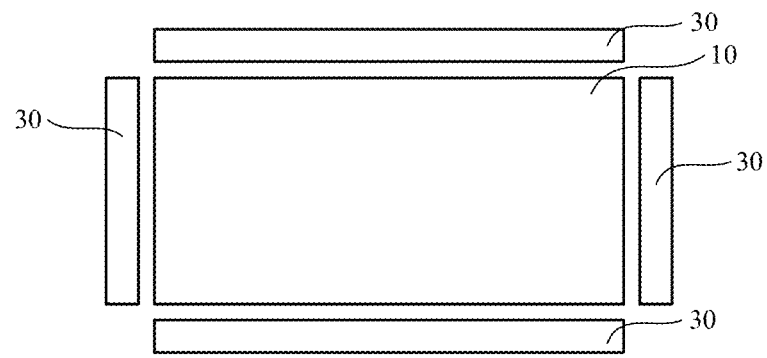
FIG. 5 is a schematic view showing a touch sensor, according to an aspect of the disclosure.

In step 402, optical signals obtained by detecting a finger to be recognized are received. The optical signals may be received by a plurality of optical sensors in the recognition area 10 in FIG. 5.

In the present example, since there is a light leakage phenomenon when the recognition area is not completely covered by the finger, the received optical signal includes a fingerprint optical signal corresponding to the finger to be recognized and an ambient optical signal (other optical signals other than the fingerprint optical signal).

In step 404, a fingerprint optical signal corresponding to the finger to be recognized in the optical signals is determined.

Here, the fingerprint optical signal can be determined in the following manner:

1. Directly Determining the Fingerprint Optical Signal
1) Through a Coverage Area of a Finger It is possible to first sense a coverage area of the finger to be recognized and take an optical signal corresponding to the coverage area as the fingerprint optical signal. The coverage area of the finger to be recognized may be obtained by a touch region or a pressing region of the finger.

Figure 6:
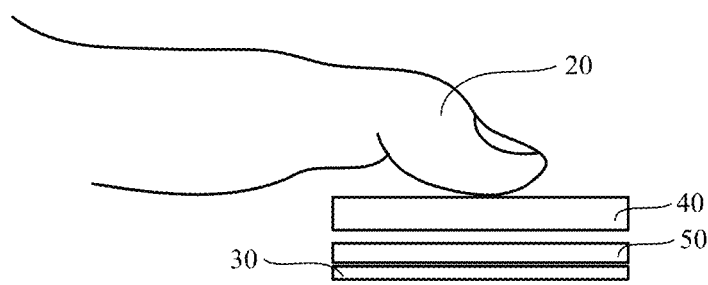
FIG. 6 is a schematic view showing another touch sensor, according to an aspect of the disclosure.

For example, it is possible to detect the touch region of the finger to be recognized and take the touch region as the coverage area of the finger to be recognized. In one case, referring to FIG. 5, a touch sensor 30 may be provided around the recognition area 10. For example, one touch sensor 30 may be provided on each of upper, lower, left and right sides of the recognition area 10, for detecting a touch operation of the finger 20 to be recognized. Of course, the number of touch sensors is not limited by the present disclosure. In another case, referring to FIG. 6, a light transmission area 40 is touched by the finger 20 to be recognized, and an optical fingerprint sensor 50 is located below the light transmission area 40. Based on the above configuration, the touch sensor 30 may be provided below the optical fingerprint sensor 50 for detecting the touch operation of the finger 20 to be recognized. In another case, following FIG. 6, the touch sensor 30 may also be integrated in pixels of the optical fingerprint sensor 50, in which the optical fingerprint sensor 50 is operated with the touch sensor 30 in a time-sharing manner. For example, when the touch sensor 30 are integrated in pixels of the optical fingerprint sensor 50, the touch sensor 30 may be active during a first portion of a preset time period and the optical fingerprint sensor 50 may be active during a second portion of the preset time period. The preset time period may be two clock circles of an analog to digital chip connected to at least one of the touch sensor 30 and the optical fingerprint sensor 50.

In one or more embodiments, it is possible to detect a pressing operation of the finger to be recognized for a recognition area, and determine a pressing region of the pressing operation, and take the pressing region as the coverage area of the finger to be recognized. The pressing operation and the pressing region of the pressing operation may be detected by a pressure sensor.

2) Through a Range of the Fingerprint Optical Signal

It is possible to determine an optical signal in a range of a preset fingerprint optical signal in the received optical signals, and take the determined optical signal as the fingerprint optical signal. The range of the preset fingerprint optical signal may be obtained by a person skilled in the art according to actual experimental data, and is not limited by the present disclosure. For example, the range of the preset fingerprint optical signal may be obtained using datasets from at least one of following data: training data, initial setup data, recent data from successful unlocking acts.

2. Indirectly Determining the Fingerprint Optical Signal

It is possible to determine an ambient optical signal in the received optical signals, and take other signals distinguished from the ambient optical signal in the optical signals as the fingerprint optical signal. It is possible to determine an optical signal in a range of a preset ambient optical signal in the optical signals, and take the determined optical signal as the ambient optical signal. The range of the preset ambient optical signal may be obtained by a person skilled in the art based on actual experimental data, and is not limited by the present disclosure.

The proposed methods and devices improve the signal-to-noise ratio of the acquired fingerprint information of the finger to be recognized by determining the fingerprint optical signal (i.e., the effective signal received by the optical fingerprint sensor), thereby improving the efficiency and accuracy of subsequent fingerprint recognition.

In step 406, the finger to be recognized is recognized according to the fingerprint optical signal. For example, the fingerprint optical signal may include a plurality of optical signals reflected from the finger, where the plurality of optical signals may be recorded as a fingerprint image. The device may further process the fingerprint image and recognize the finger using pattern recognition or other algorithms.

As can be seen from the above-described examples of the present disclosure, the interference caused by the ambient optical signal distinguished from the fingerprint optical signal to the fingerprint recognition may be effectively eliminated by extracting the fingerprint optical signal corresponding to the finger to be recognized from the detected optical signals and further performing fingerprint recognition on the fingerprint optical signal, thus enhancing the efficiency of fingerprint recognition and improving the accuracy of fingerprint recognition.

In correspondence to the embodiments of the aforementioned methods for optical fingerprint recognition, the present disclosure also provides a device for optical fingerprint recognition.

Figure 7:
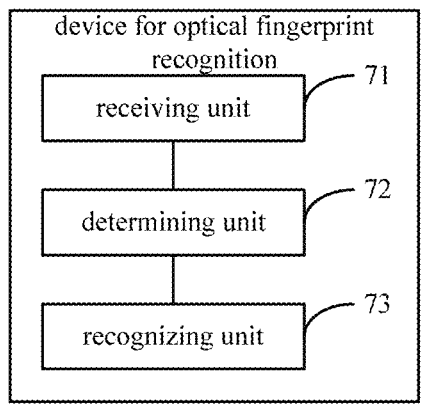
FIG. 7 is a block diagram showing a device for optical fingerprint recognition, according to an aspect of the disclosure.

FIG. 7 is a block diagram showing a device for optical fingerprint recognition, according to an aspect of the disclosure. Referring to FIG. 7, the device includes a receiving unit 71, a determining unit 72, and a recognizing unit 73.

The receiving unit 71 is configured to receive optical signals obtained by sensors in a first area when detecting a finger to be recognized is placed in the first area.

The determination unit 72 is configured to determine a plurality of fingerprint optical signals in a coverage area corresponding to the finger to be recognized in the optical signals.

The recognition unit 73 is configured to recognize the finger to be recognized according to the plurality of fingerprint optical signals in the coverage area.

Figure 8:
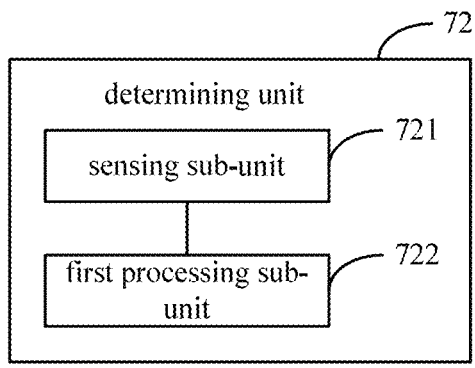
FIG. 8 is a block diagram showing another device for optical fingerprint recognition, according to an aspect of the disclosure.

FIG. 8 is a block diagram showing another device for optical fingerprint recognition, according to an aspect of the disclosure. Referring to FIG. 8, in this example based on FIG. 7, the determination unit 72 may include a sensing sub-unit 721 and a first processing sub-unit 722.

The sensing sub-unit 721 is configured to sense a coverage area of the finger to be recognized.

The first processing sub-unit 722 is configured to take an optical signal corresponding to the coverage area as the fingerprint optical signal.

Figure 9:
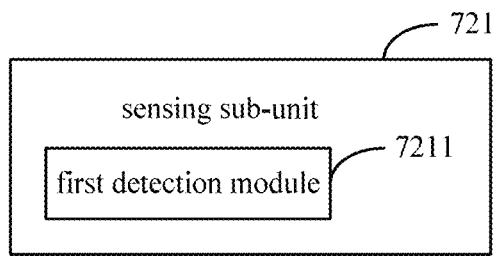
FIG. 9 is a block diagram showing another device for optical fingerprint recognition, according to an aspect of the disclosure.

FIG. 9 is a block diagram showing another device for optical fingerprint recognition, according to an aspect of the disclosure. Referring to FIG. 9, in this example based on FIG. 8, the sensing sub-unit 721 may include a first detection module 7211.

The first detection module 7211 is configured to detect a touch region of the finger to be recognized, and take the touch region as the coverage area of the finger to be recognized.

Figure 10:
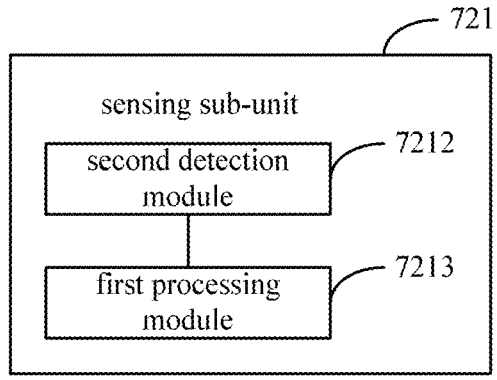
FIG. 10 is a block diagram showing another device for optical fingerprint recognition, according to an aspect of the disclosure.

FIG. 10 is a block diagram showing another device for optical fingerprint recognition, according to an aspect of the disclosure. Referring to FIG. 10, in this example based on FIG. 8, the sensing sub-unit 721 may include a second detection module 7212 and a first processing module 7213.

The second detection module 7212 is configured to detect a pressing operation of the finger to be recognized for a recognition area and determine a pressing region of the pressing operation.

The first processing module 7213 is configured to take the pressing region as the coverage area of the finger to be recognized.

Figure 11:
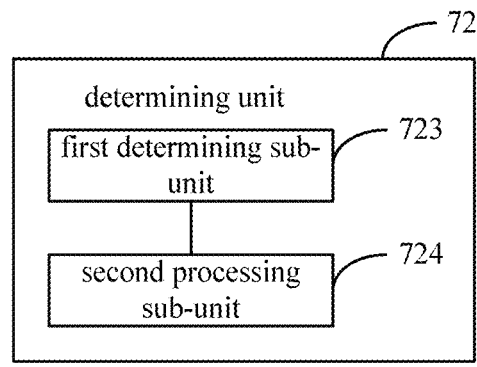
FIG. 11 is a block diagram showing another device for optical fingerprint recognition according to an aspect of the disclosure.

FIG. 11 is a block diagram showing another device for optical fingerprint recognition, according to an aspect of the disclosure. Referring to FIG. 11, in this example based on FIG. 7, the determining unit 72 may include a first determining sub-unit 723 and a second processing sub-unit 724.

The first determining sub-unit 723 is configured to determine an optical signal in a range of a preset fingerprint optical signal in the optical signals.

The second processing sub-unit 724 is configured to take the determined optical signal as the fingerprint optical signal.

It should be noted that the configurations of the first determining sub-unit 723 and the second processing sub-unit 724 in the above-described device example shown in FIG. 11 may also be included in the device shown in FIGS. 8-10 described above, and are not limited by the present disclosure.

Figure 12:
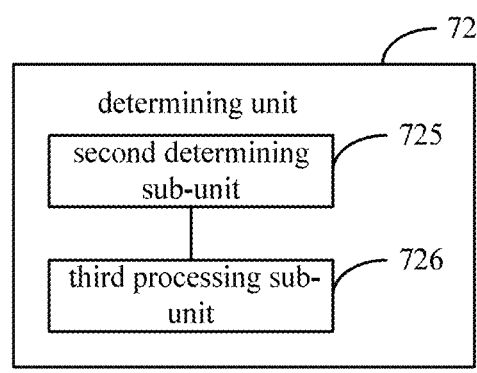
FIG. 12 is a block diagram showing another device for optical fingerprint recognition according to an aspect of the disclosure.

FIG. 12 is a block diagram showing another device for optical fingerprint recognition, according to an aspect of the disclosure. Referring to FIG. 12, in this example based on FIG. 7, the determining unit 72 may include a second determining sub-unit 725 and a third processing sub-unit 726.

The second determining sub-unit 725 is configured to determine an ambient optical signal in the optical signals.

The third processing sub-unit 726 is configured to take other signals distinguished from the ambient optical signal in the optical signals as the fingerprint optical signal.

It should be noted that the configurations of the second determining sub-unit 725 and the third processing sub-unit 726 in the above-described device example shown in FIG. 12 may also be included in the device examples shown in FIGS. 8-10 described above, and are not limited by the present disclosure.

Figure 13:
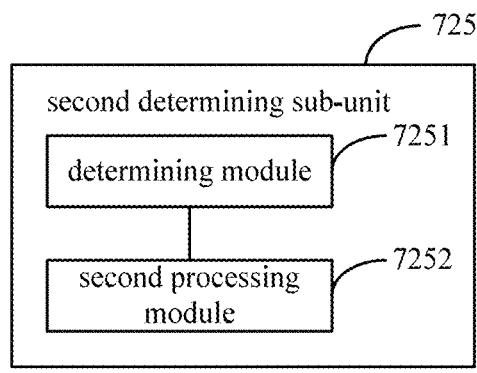
FIG. 13 is a block diagram showing another device for optical fingerprint recognition, according to an aspect of the disclosure.

FIG. 13 is a block diagram showing another device for optical fingerprint recognition, according to an aspect of the disclosure. Referring to FIG. 13, in this example based on FIG. 12, the second determining sub-unit 725 may include a determining module 7251 and a second processing module 7252.

The determining module 7251 is configured to determine an optical signal in a range of a preset fingerprint optical signal in the optical signals.

The second processing module 7252 is configured to take the determined optical signal as the ambient optical signal.

With respect to the devices in the above embodiments, the specific manners for performing operations for individual modules therein have been described in detail in the embodiments regarding the methods for optical fingerprint recognition, which will not be elaborated herein.

For the device embodiments, since they substantially correspond to the method embodiments, reference can be made to the description of the part of the method embodiments. The device embodiments described above are merely illustrative, in which the units described as the separate components may or may not be separate physically, and the components shown as the display units may or may not be a physical unit, i.e., may be located at a same place, or can be distributed to multiple network units. The part or all of the modules may be selected according to the actual requirements to implement the purpose of the present disclosure. It can be understood and practiced by those skilled in the art without creative work.

Correspondingly, in the present disclosure, there is provided a device for optical fingerprint recognition, including: a processor; a memory for storing instructions executable by the processor; in which the processor is configured to: receive optical signals obtained by sensors in a first area when detecting a finger to be recognized is placed in the first area; determine a plurality of fingerprint optical signals in a coverage area corresponding to the finger to be recognized in the optical signals; and recognize the finger to be recognized according to the plurality of fingerprint optical signals in the coverage area.

Correspondingly, in the present disclosure, there is provided a terminal, including a memory and one or more programs, in which one or more programs are stored in the memory and configured to be executed by one or more processors. The one or more programs include the instructions for performing the following operations: receiving optical signals obtained by sensors in a first area when detecting a finger to be recognized is placed in the first area; determining a plurality of fingerprint optical signals in a coverage area corresponding to the finger to be recognized in the optical signals; and recognizing the finger to be recognized according to the plurality of fingerprint optical signals in the coverage area.

Figure 14:
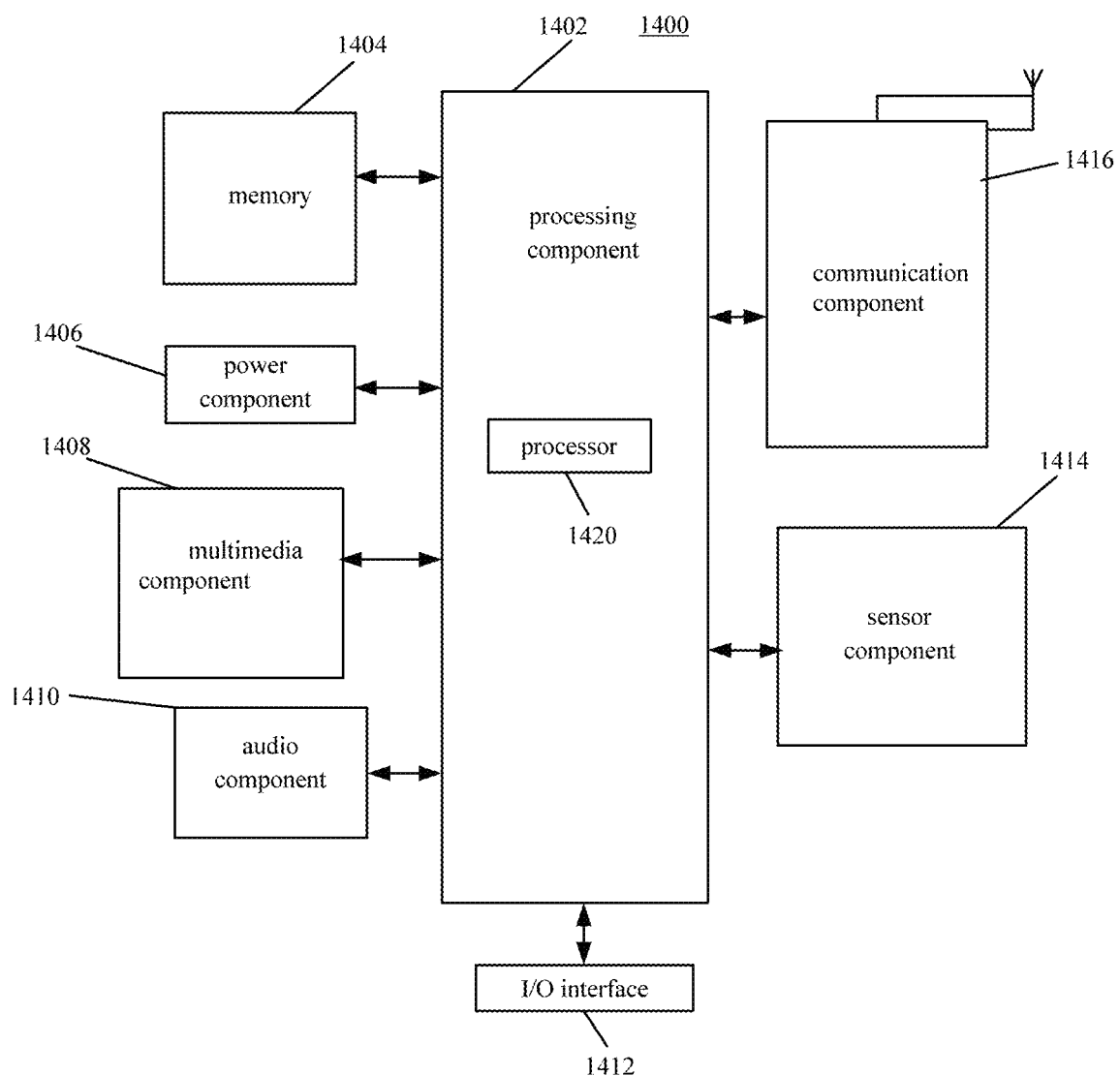
FIG. 14 is a block diagram showing a device for optical fingerprint recognition, according to an aspect of the disclosure.

FIG. 14 is a block diagram of a device 1400 for optical fingerprint recognition, according to an aspect of the disclosure. For example, the device 1400 may be a mobile phone, a computer, a digital broadcast terminal, a messaging device, a gaming console, a tablet, a medical device, exercise equipment, a personal digital assistant, and the like.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and any other components associated with the generation, management, and distribution of power in the device 1400.

The multimedia component 1408 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the device 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone ("MIC") configured to receive an external audio signal when the device 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keypad, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the device 1400 and other devices. The device 1400 can access a wireless network based on a communication standard, such as WiFi, 2G, or 3G, or a combination thereof. In one aspect of the disclosure, the communication component 1416 receives a broadcast signal or broadcast associated information from an external broadcast management system via a broadcast channel. In one aspect of the disclosure, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In aspect of the disclosures, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module or unit may be implemented at least partially using the above circuit components.

In aspect of the disclosures, there is also provided a non-transitory computer-readable storage medium including instructions, such as included in the memory 1404, executable by the processor 1420 in the device 1400, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for optical fingerprint recognition, comprising:
   receiving optical signals obtained by sensors in a first area when a finger to be recognized is placed in the first area, wherein the first area comprises a coverage area within a fingerprint contour of the finger to be recognized;
   determining the fingerprint contour is determined using a signal range of a preset fingerprint optical signal that changes based on ambient light;
   determining, from the optical signals, a plurality of fingerprint optical signals in the coverage area by selecting a portion of the optical signals in the signal range of the preset fingerprint optical signal;
   recording the plurality of fingerprint optical signals as a fingerprint image; and
   processing the fingerprint image and recognizing the finger to be recognized according to the plurality of fingerprint optical signals in the coverage area of the fingerprint image.

2. The method of claim 1, wherein determining, from the optical signals, the plurality of fingerprint optical signals in the coverage area by selecting a portion of the optical signals in the signal range of the preset fingerprint optical signal__comprises:
   sensing the coverage area of the finger to be recognized; and
   taking an optical signal corresponding to the coverage area as the fingerprint optical signal.

3. The method of claim 2, wherein sensing the coverage area of the finger to be recognized comprises:
   detecting a touch region of the finger to be recognized, and taking the touch region as the coverage area of the finger to be recognized.

4. The method of claim 2, wherein sensing the coverage area of the finger to be recognized comprises:
   detecting a pressing operation of the finger to be recognized for a recognition area and determining a pressing region of the pressing operation; and
   taking the pressing region as the coverage area of the finger to be recognized.

5. The method of claim 1, wherein determining, from the optical signals, the plurality of fingerprint optical signals in the coverage area by selecting a portion of the optical signals in the signal range of the preset fingerprint optical signal comprises:
   determining an ambient optical signal in the optical signals; and
   taking other signals distinguished from the ambient optical signal in the optical signals as the fingerprint optical signal.

6. The method of claim 5, wherein determining the ambient optical signal in the optical signals comprises:
   determining, from the optical signals, an optical signal within the signal range, wherein the signal range comprises a preset ambient optical signal; and
   taking the determined optical signal as the ambient optical signal.

7. A device for optical fingerprint recognition, comprising:
   one or more processors;
   a non-transitory computer-readable storage medium for storing instructions executable by the one or more processors;
   wherein the one or more processors are configured to perform acts comprising:
      receive optical signals obtained by sensors in a first area when a finger to be recognized is placed in the first area, wherein the first area comprises a coverage area within a fingerprint contour of the finger to be recognized;
      determine the fingerprint contour using a signal range of a preset fingerprint optical signal that changes based on ambient light;
      determine, from the optical signals, a plurality of fingerprint optical signals in the coverage area by selecting a portion of the optical signals in the signal range of the preset fingerprint optical signal;
      record the plurality of fingerprint optical signals as a fingerprint image; and
      process the fingerprint image and recognize the finger to be recognized according to the plurality of fingerprint optical signals in the coverage area of the fingerprint image.

8. The device of claim 7, wherein the one or more processors configured to determine, from the optical signals, the plurality of fingerprint optical signals in the coverage area by selecting a portion of in the optical signals in the signal range of the preset fingerprint optical signal are further configured to:
   sense the coverage area of the finger to be recognized; and
   take an optical signal corresponding to the coverage area as the fingerprint optical signal.

9. The device of claim 8, wherein the one or more processors configured to sense the coverage area of the finger to be recognized are further configured to:
   detect a touch region of the finger to be recognized, and take the touch region as the coverage area of the finger to be recognized.

10. The device of claim 8, wherein the one or more processors configured to sense the coverage area of the finger to be recognized are further configured to:
    detect a pressing operation of the finger to be recognized for a recognition area and determining a pressing region of the pressing operation; and
    take the pressing region as the coverage area of the finger to be recognized.

11. The device of claim 7, wherein the one or more processors configured to determine, from the optical signals, the plurality of fingerprint optical signals in the coverage area by selecting a portion of in the optical signals in the signal range of the preset fingerprint optical signal are further configured to:
    determine an ambient optical signal in the optical signals; and
    take other signals distinguished from the ambient optical signal in the optical signals as the fingerprint optical signal.

12. The device of claim 11, wherein the one or more processors configured to determine the ambient optical signal in the optical signals are further configured to:

determine, from the optical signals, an optical signal within the signal range, wherein the signal range comprises a preset ambient optical signal; and take the determined optical signal as the ambient optical signal.

13. A computer-readable storage medium having stored therein instructions that, when executed by one or more processors, are configured to perform acts comprising:

receiving optical signals obtained by sensors in a first area when a finger to be recognized is placed in the first area, wherein the first area comprises a coverage area within a fingerprint contour of the finger to be recognized;

determining the fingerprint contour using a signal range of a preset fingerprint optical signal that changes based on ambient light;

determining, from the optical signals, a plurality of fingerprint optical signals in the coverage area by selecting a portion of the optical signals in the signal range of the preset fingerprint optical signal;

recording the plurality of fingerprint optical signals as a fingerprint image; and processing the fingerprint image and recognizing the finger to be recognized according to the plurality of fingerprint optical signals in the coverage area of the fingerprint image.

14. The computer-readable storage medium of claim 13, wherein determining, from the optical signals, the plurality of fingerprint optical signals in the coverage area by selecting a portion of the optical signals in the signal range of the preset fingerprint optical signal further causes the one or more processors to perform:

sensing the coverage area of the finger to be recognized; and taking an optical signal corresponding to the coverage area as the fingerprint optical signal.

15. The computer-readable storage medium of claim 14, wherein sensing the coverage area of the finger to be recognized further causes the one or more processors to perform:

detecting a touch region of the finger to be recognized, and taking the touch region as the coverage area of the finger to be recognized.

16. The computer-readable storage medium of claim 14, wherein sensing the coverage area of the finger to be recognized further causes the one or more processors to perform:

detecting a pressing operation of the finger to be recognized for a recognition area and determining a pressing region of the pressing operation; and taking the pressing region as the coverage area of the finger to be recognized.

17. The computer-readable storage medium of claim 13, wherein determining, from the optical signals, the plurality of fingerprint optical signals in the coverage area by selecting a portion of the optical signals in the signal range of the preset fingerprint optical signal further causes the one or more processors to perform:

determining an ambient optical signal in the optical signals; and taking other signals distinguished from the ambient optical signal in the optical signals as the fingerprint optical signal, wherein determining the ambient optical signal in the optical signals comprises:

determining, from the optical signals, an optical signal within the signal range, wherein the signal range comprises a preset ambient optical signal; and taking the determined optical signal as the ambient optical signal.

18. The method of claim 1, wherein the signal range of the preset fingerprint optical signal is obtained using a dataset from training data.

19. The device of claim 7, wherein the signal range of the preset fingerprint optical signal is obtained using a dataset from training data.

20. The computer-readable storage medium of claim 13, wherein the signal range of the preset fingerprint optical signal is obtained using a dataset from training data.

* * * * *